UNITED STATES PATENT OFFICE.

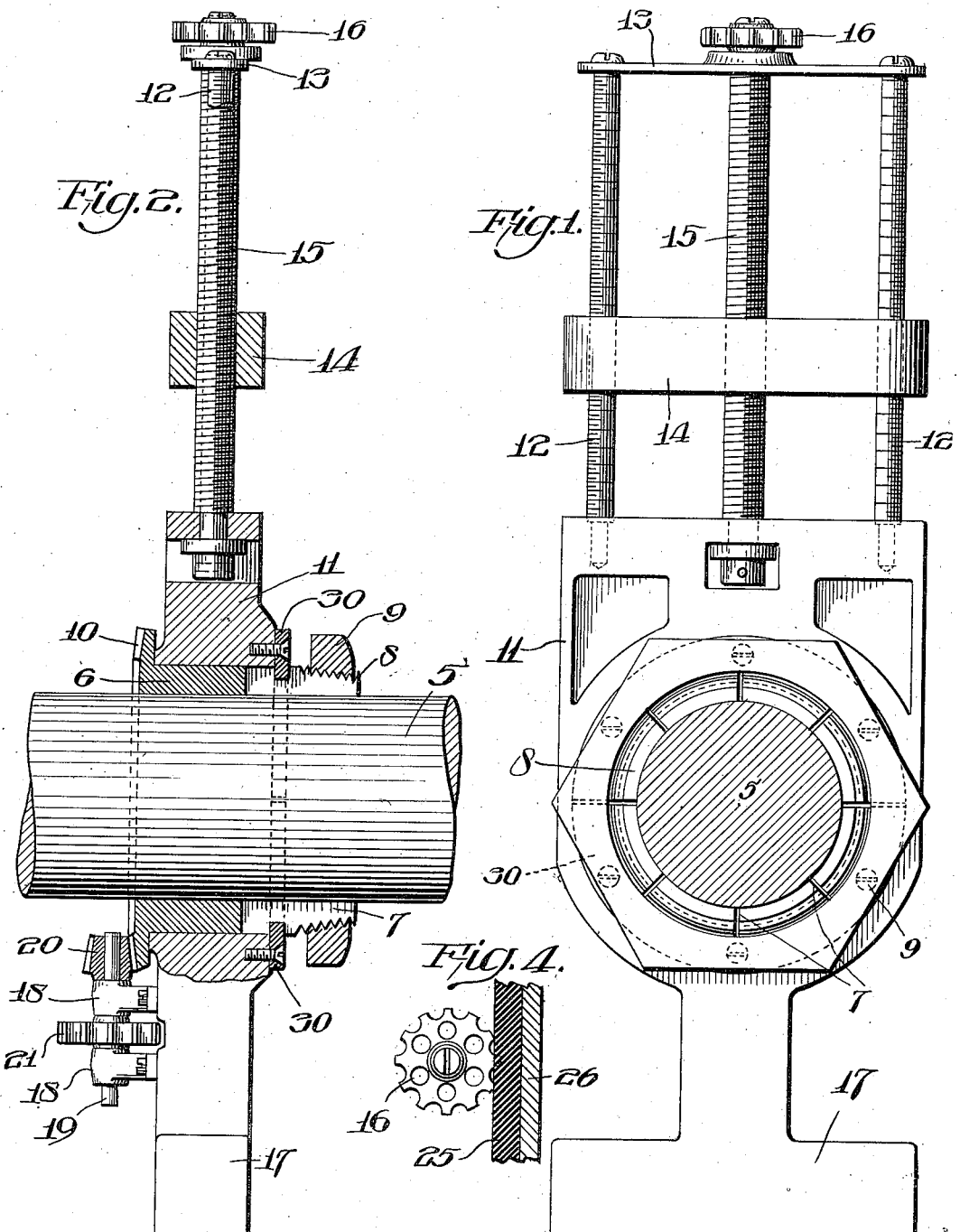

NICHOLAS W. AKIMOFF, OF PHILADELPHIA, PENNSYLVANIA, ASSIGNOR TO VIBRATION SPECIALTY COMPANY, A CORPORATION OF DELAWARE.

BALANCING APPLIANCE.

1,296,732.  Specification of Letters Patent.  Patented Mar. 11, 1919.

Application filed October 25, 1917, Serial No. 198,533. Renewed January 29, 1919. Serial No. 273,884.

*To all whom it may concern:*

Be it known that I, NICHOLAS W. AKIMOFF, a citizen or subject of the constituted government of Russia, (but who has declared his intention of becoming a citizen of the United States,) residing at Philadelphia, in the county of Philadelphia and State of Pennsylvania, have invented certain new and useful Improvements in Balancing Appliances, of which the following is a specification.

My invention relates to a balancing appliance, that is to say to an improved form of apparatus adapted to ascertain, for the purpose of correction, the quantum of dynamic unbalance existing in a rotatable body such, for example, as a machine element which for its most efficient operation requires that the mass be properly distributed so as to rotate without setting up vibration or objectionable periodic stresses. The object of my present invention is to provide a simple and efficient appliance which may be readily and conveniently mounted with respect to a rotatable body whereby the amount of unbalanced distribution of the mass of said rotatable body may be quickly and easily determined, and a further object of my invention is to provide means whereby said appliance may be actuated by the operator while the body under examination is being rotated to bring the appliance to a condition to balance said rotatable body without necessitating the constant stoppage of the rotation during the test. For the accomplishment of the foregoing objects, my invention contemplates the provision of an appliance which may be readily mounted on a rotatable shaft adjacent the body or element under examination and which is provided with means adapted to be operated during the rotation of said shaft for causing an angular shift of the appliance as well as a radial shift of the balancing weight carried by the appliance.

The nature and characteristic features of my invention will be more readily understood from the following description taken in connection with the accompanying drawings forming part hereof, in which :—

Figure 1 is a front elevational view of an appliance embodying the main features of my invention, the same being shown mounted on a shaft with the balancing weight shifted as required when unbalanced distribution of the mass exists in the body or element under examination;

Fig. 2 is a view partly in side elevation and partly in vertical central section of said appliance;

Fig. 3 is an end elevation of a portion thereof; and

Fig. 4 is a fragmentary view showing the manner of operation of the two adjustments required during the operation of the appliance.

Referring to the drawings 5 is the rotatable shaft which may be a part of the body under examination or may be an arbor upon which the same is mounted. Mounted on said shaft is a sleeve 6 having one end thereof split as at 7 which end is also provided with a tapered thread 8 upon which the complementary nut 9 is threaded, which nut is adapted when advanced upon said thread to contract the split portion of the sleeve 6 to effectively clamp the sleeve 6 to the shaft 5. The other end of the sleeve 6 is provided with a bevel gear 10 for a purpose to be presently explained. It will of course be understood that a plurality of sleeves 6 having different internal diameters may be provided if desired to enable the apparatus to be used on different sized shafts.

Upon the sleeve 6 there is journaled a frame 11 which is limited as to longitudinal movement thereon by means of a split ring 30 which engages a complemental groove in sleeve 6. Extending from one side of frame 11 are two projecting guide rods 12 upon each of which is a graduated scale the purpose of which will be later set forth. The outer ends of the rods 12 are connected by a yoke 13. A shiftable weight 14 is slidably mounted on the rods 12, and the distance of weight 14 from the center of the shaft is controlled by means of a threaded rod 15 which is journaled at its inner end in the frame 11 and at its outer end in the yoke 13. Attached to the threaded rod 15 at the outer end thereof and located outside of the yoke 13 is a toothed wheel 16 which when rotated is adapted to turn the rod 15 and thereby shift the weight 14 as to its distance from the axis of rotation of the shaft 5. Oppositely disposed with respect to the shiftable weight 14 and preferably integral with the frame 11 is a fixed counterbalancing weight 17, the mass of which is such that the entire appliance is thereby statically balanced when the shiftable weight 14 is located at some predetermined position on the guide rods 12.

Mounted on one side of the frame 11, at any convenient location, are bearings 18 in which a spindle 19 is journaled and upon the end of the spindle 19 is a bevel pinion 20 which meshes with the bevel gear 10 carried on the end of the sleeve 6. The spindle 19 also carries a toothed wheel 21 similar to the other toothed wheel 16 above referred to. The purpose of the foregoing arrangement is to cause an angular shift of the appliance about the axis of the shaft 5 when the toothed wheel 21 is actuated.

All the parts are accurately made, calibrated and balanced, so that when the shiftable weight 14 is located at some predetermined position there will be no centrifugal effect caused by the appliance when the shaft is rotated. When however, it is desired to shift said weight to introduce such a centrifugal effect to counterbalance an unequal distribution of the mass of the body under examination, which however may be statically balanced, the toothed wheel 16 may be periodically engaged by a device which may comprise a piece of rubber 25 mounted upon a supporting plate 26 and manually or otherwise brought into contact with toothed wheel 16 so that as the toothed periphery of said wheel is engaged by the rubber said wheel will be rotated whereby the threaded rod 15 will be turned to cause the weight 14 to be shifted, and this without necessitating the stoppage of the rotation of the shaft upon which the appliance is mounted. Likewise the angular position of the appliance may be readily shifted by contacting the engaging device with the wheel 21 to thereby rotate the pinion 20 which engages the gear 10, which as will be readily understood is fixedly located with respect to the shaft 5, and the angular shift will be caused by the planetary action of the pinion 20 around the gear 10.

The operation of the device can now be readily understood. The body (not shown) which is to be dynamically balanced by means of the appliance is first statically balanced in any preferred manner, and the appliance is then mounted on the shaft 5 which, as before stated, may be the shaft of the body itself or may be an arbor upon which the body is also mounted for the purpose of the testing, and the shaft is then mounted in any kind of a rotating device which however, for the most efficient operation, should have at least one of its bearings of a floating or pendular character. The weight 14 is then progressively shifted during the rotation of the body as is also the angular position of the entire appliance until all vibration is eliminated, whereupon by observing, by means of the graduated scales on rods 12, the displacement of the weight 14 which is required to overcome the dynamic unbalance existing in the body the amount of correction required may be readily determined, as also the angular location of the disturbing centrifugal couple, and there may thus be determined the value of balancing couple which is required to correct the inequality in the distribution of the mass of the body, as well as its angular location.

Having thus described the nature and characteristic features of my invention, what I claim as new and desire to secure by Letters Patent is:—

1. A balancing appliance comprising means for attaching the same upon a rotatable shaft, means for arbitrarily shifting the anglular position of the appliance with respect to said attaching means during the rotation of said shaft, a shiftable weight, and means for arbitrarily shifting the position of said weight in a radial direction during the rotation of said shaft.

2. A balancing appliance comprising means for attaching the same upon a rotatable shaft, a shiftable weight, and means for arbitrarily shifting the angular and radial position of said weight during the rotation of said shaft.

3. A balancing appliance comprising means for attaching the same upon a rotatable shaft, a frame journaled with respect to said attaching means, means for arbitrarily changing the angular position of said frame upon said attaching means, a weight carried by said frame and shiftable with respect thereto in a radial direction, and means for arbitrarily changing the position of said weight.

4. A balancing appliance comprising means for attaching the same upon a rotatable shaft, a frame journaled with respect to said attaching means, means for arbitrarily changing the angular position of said frame upon said attaching means during the rotation of said shaft; a weight carried by said frame and shiftable with respect thereto in a radial direction, and means for arbitrarily changing the position of said weight during the rotation of said shaft.

5. A balancing appliance comprising means for attaching the same upon a rotatable shaft, a frame journaled with respect to said attaching means, means for arbitrarily changing the angular position of said frame upon said attaching means during the rotation of said shaft, a weight carried by said frame and shiftable with respect thereto in a radial direction, means for arbitrarily changing the position of said weight during the rotation of said shaft comprising a rod in threaded engagement with said weight and a toothed wheel carried by said rod and adapted to be externally engaged to turn said rod.

6. A balancing appliance comprising means for attaching the same upon a rotatable shaft, a frame journaled with respect to said attaching means, means for arbitrarily changing the angular position of said frame upon said attaching means during the rotation of said shaft comprising a gear carried by said attaching means, a pinion mounted upon a spindle journaled in bearings carried by said frame and a toothed wheel carried by said spindle and adapted to be externally engaged to turn said spindle; a weight carried by said frame and shiftable with respect thereto in a radial direction, and means for arbitrarily changing the position of said weight during the rotation of said shaft.

7. A balancing appliance comprising means for attaching the same upon a rotatable shaft, a frame journaled with respect to said attaching means, means for arbitrarily changing the angular position of said frame upon said attaching means during the rotation of said shaft comprising a gear carried by said attaching means, a pinion mounted upon a spindle journaled in bearings carried by said frame and a toothed wheel carried by said spindle and adapted to be externally engaged to turn said spindle; a weight carried by said frame and shiftable with respect thereto in a radial direction, means for arbitrarily changing the position of said weight during the rotation of said shaft comprising a rod in threaded engagement with said weight and a toothed wheel carried by said rod and adapted to be externally engaged to turn said rod.

8. A balancing appliance comprising means for attaching the same upon a rotatable shaft, a frame journaled with respect to said attaching means, means for arbitrarily changing the angular position of said frame upon said attaching means during the rotation of said shaft comprising a gear carried by said attaching means, a pinion mounted upon a spindle journaled in bearings carried by said frame and a toothed wheel carried by said spindle and adapted to be externally engaged to turn said spindle; a weight carried by said frame and shiftable with respect thereto in a radial direction, means for arbitrarily changing the position of said weight during the rotation of said shaft comprising a rod in threaded engagement with said weight and a toothed wheel carried by said rod and adapted to be externally engaged to turn said rod, and a fixed counterbalancing weight carried by said frame.

9. A balancing appliance comprising means for attaching the same upon a rotatable shaft, a frame journaled with respect to said attaching means, means for arbitrarily changing the angular position of said frame upon said attaching means comprising a gear carried by said attaching means, a pinion mounted upon a spindle journaled in bearings carried by said frame and a toothed wheel carried by said spindle and adapted to be externally engaged to turn said spindle, a weight carried by said frame and shiftable with respect thereto in a radial direction, and means for arbitrarily changing the position of said weight comprising a rod in threaded engagement with said weight and a toothed wheel carried by said rod and adapted to be externally engaged to turn said rod.

10. A balancing appliance comprising a sleeve adapted to be mounted upon and attached to a rotatable shaft, a frame journaled upon said sleeve, means for arbitrarily changing the angular position of said frame upon said sleeve during the rotation of said shaft, a weight carried by said frame and shiftable with respect thereto in a radial direction, and means for arbitrarily changing the position of said weight during the rotation of said shaft.

11. A balancing appliance comprising a sleeve adapted to be mounted upon and attached to a rotatable shaft, a frame journaled upon said sleeve, means for arbitrarily changing the angular position of said frame upon said sleeve during the rotation of said shaft, a weight carried by said frame and shiftable with respect thereto in a radial direction, means for arbitrarily changing the position of said weight during the rotation of said shaft comprising a rod in threaded engagement with said weight and a toothed wheel carried by said rod and adapted to be externally engaged to turn said rod.

12. A balancing appliance comprising a sleeve adapted to be mounted upon and attached to a rotatable shaft, a frame journaled upon said sleeve, means for arbitrarily changing the angular position of said frame upon said sleeve during the rotation of said shaft comprising a gear carried by said sleeve, a pinion mounted upon a spindle journaled in bearings carried by said frame and a toothed wheel carried by said spindle and adapted to be externally engaged to turn said spindle; a weight carried by said frame and shiftable with respect thereto in a radial direction, and means for arbitrarily changing the position of said weight during the rotation of said shaft.

13. A balancing appliance comprising a sleeve adapted to be mounted upon and attached to a rotatable shaft, a frame journaled upon said sleeve, means for arbitrarily changing the angular position of said frame upon said sleeve during the rotation of said shaft comprising a gear carried by said sleeve, a pinion mounted upon a spindle journaled in bearings carried by said frame and a toothed wheel carried by said spindle and adapted to be externally engaged to turn said spindle; a weight carried by said frame and shiftable with respect thereto in a radial direction, means for arbitrarily changing the position of said weight during the rotation of said shaft comprising a rod in threaded engagement with said weight and a toothed wheel carried by said rod, and adapted to be externally engaged to turn said rod.

14. A balancing appliance comprising a sleeve adapted to be mounted upon and attached to a rotatable shaft, a frame journaled upon said sleeve, means for arbitrarily changing the angular position of said frame upon said sleeve during the rotation of said shaft comprising a gear carried by said sleeve, a pinion mounted upon a spindle journaled in bearings carried by said frame and a toothed wheel carried by said spindle and adapted to be externally engaged to turn said spindle a weight carried by said frame and shiftable with respect thereto in a radial direction, means for arbitrarily changing the position of said weight during the rotation of said shaft comprising a rod in threaded engagement with said weight and a toothed wheel carried by said rod and adapted to be externally engaged to turn said rod, and a fixed counterbalancing weight carried by said frame.

In testimony whereof I have hereunto signed my name.

NICHOLAS W. AKIMOFF.